(12) United States Patent
Shimizu et al.

(10) Patent No.: US 8,757,882 B2
(45) Date of Patent: Jun. 24, 2014

(54) FLUID DYNAMIC BEARING DEVICE

(75) Inventors: Kazuto Shimizu, Kuwana (JP); Tetsuya Yamamoto, Kuwana (JP)

(73) Assignee: NTN Corporation, Osaka-shi (JP)

( * ) Notice: Subject to any disclaimer, the term of this patent is extended or adjusted under 35 U.S.C. 154(b) by 226 days.

(21) Appl. No.: 12/741,729

(22) PCT Filed: Nov. 11, 2008

(86) PCT No.: PCT/JP2008/070523
§ 371 (c)(1),
(2), (4) Date: May 6, 2010

(87) PCT Pub. No.: WO2009/072374
PCT Pub. Date: Jun. 11, 2009

(65) Prior Publication Data
US 2010/0244601 A1   Sep. 30, 2010

(30) Foreign Application Priority Data
Dec. 7, 2007  (JP) ................................. 2007-317382

(51) Int. Cl.
*F16C 32/06* (2006.01)
(52) U.S. Cl.
USPC .......................................... 384/107
(58) Field of Classification Search
USPC ............... 384/100, 107, 114, 121; 360/98.07, 360/99.08
See application file for complete search history.

(56) References Cited

U.S. PATENT DOCUMENTS

| | | | |
|---|---|---|---|
| 5,559,382 A | 9/1996 | Oku et al. | |
| 5,994,803 A * | 11/1999 | Jung | 310/51 |
| 6,172,847 B1 * | 1/2001 | Sakatani et al. | 360/99.08 |
| 6,252,322 B1 * | 6/2001 | Kawawada et al. | 310/90 |
| 6,412,984 B2 * | 7/2002 | Asai et al. | 384/107 |
| 6,832,853 B2 * | 12/2004 | Fujinaka | 384/100 |
| 6,980,394 B2 * | 12/2005 | Inoue et al. | 360/99.08 |
| 7,059,771 B2 * | 6/2006 | Gomyo et al. | 384/100 |
| 7,154,704 B2 * | 12/2006 | Sheu | 360/99.08 |

(Continued)

FOREIGN PATENT DOCUMENTS

| | | |
|---|---|---|
| JP | 6-189490 A | 7/1994 |
| JP | 6-189492 A | 7/1994 |

(Continued)

OTHER PUBLICATIONS

Notification of Transmittal of Translation of the International Preliminary Report on Patentability (Form PCT/IB/338) of International Application No. PCT/JP2008/070523 mailed Aug. 19, 2010 with Forms PCT/IB/373 and PCT/ISA/237.

(Continued)

*Primary Examiner* — Marcus Charles
*Assistant Examiner* — Adam D Rogers
(74) *Attorney, Agent, or Firm* — Westerman, Hattori, Daniels & Adrian, LLP

(57) ABSTRACT

Provided is a fluid dynamic bearing device, which fixes a lid member (10) to a bracket (6) or forms the lid member (10) and the bracket (6) integrally so that the bracket (6) exerts the release resistance of the lid member (10). As a result, the fluid dynamic bearing device can alleviate a fixing force required between a housing (7) and the lid member (10) or can make their fixture unnecessary, to thereby maintain the release resistance of the lid member (10) irrespective of a material of the housing (7).

5 Claims, 5 Drawing Sheets

(56) References Cited

U.S. PATENT DOCUMENTS

| | | | |
|---|---|---|---|
| 8,256,962 B2* | 9/2012 | Ito et al. | 384/107 |
| 2004/0017954 A1* | 1/2004 | Komori et al. | 384/100 |
| 2006/0220480 A1* | 10/2006 | Takehara et al. | 310/90 |
| 2007/0172160 A1* | 7/2007 | Satoji et al. | 384/100 |
| 2007/0230842 A1* | 10/2007 | Tamaoka et al. | 384/121 |
| 2009/0016655 A1* | 1/2009 | Nakajima et al. | 384/100 |
| 2009/0046960 A1* | 2/2009 | Hibi et al. | 384/107 |
| 2011/0019948 A1* | 1/2011 | Hori et al. | 384/114 |
| 2011/0097025 A1* | 4/2011 | Satoji et al. | 384/100 |
| 2011/0176758 A1* | 7/2011 | Bito et al. | 384/121 |

FOREIGN PATENT DOCUMENTS

| | | |
|---|---|---|
| JP | 2007-51717 A | 3/2007 |
| JP | 2007-285414 A | 11/2007 |
| WO | WO 2006059205 A1 * | 6/2006 |
| WO | WO 2006109401 A1 * | 10/2006 |
| WO | WO 2006115104 A1 * | 11/2006 |

OTHER PUBLICATIONS

International Search Report of PCT/JP2008/070523, mailing date of Feb. 17, 2009.

* cited by examiner

FLUID DYNAMIC BEARING DEVICE

CROSS-REFERENCE TO RELATED APPLICATIONS

This application is a national stage application filed under 35 USC §371 of International Application No. PCT/JP2008/070523, filed Nov. 11, 2008, which claims the priority of Japanese Application Number JP 2007-317382, filed Dec. 7, 2007, the contents of which are incorporated herein by reference in their entirety.

TECHNICAL FIELD

The present invention relates to a fluid dynamic bearing device that rotatably supports a shaft member by a fluid film formed in a radial bearing gap.

BACKGROUND ART

Due to its high rotational accuracy and calmness, a fluid dynamic bearing device can be used in a spindle motor for an information apparatus, such as a magnetic disk drive like an HDD, an optical disk drive for a CD-ROM, CD-R/RW, DVD-ROM/RAM, or the like, or a magneto-optical disk drive for an MD, MO, or the like, a polygon scanner motor of a laser beam printer (LBP), a motor for a projector color wheel, or a small motor, such as a fan motor for a cooling fan in an electrical apparatus or the like.

For example, a fluid dynamic bearing device described in JP 2007-285414 A includes: a housing opened on axial both ends thereof; a bearing sleeve arranged on an inner periphery of the housing; a shaft member inserted into an inner periphery of the bearing sleeve; and a lid member that closes a one-end opening portion of the housing. The lid member is formed into a substantial disc shape, and an outer peripheral surface thereof is fixed to an inner peripheral surface of the housing. The fluid dynamic bearing device is incorporated into a motor by fixing an outer peripheral surface of the housing to an inner peripheral surface of a bracket.

SUMMARY OF THE INVENTION

For example, in a fluid dynamic bearing device used in the spindle motor for the HDD, when an impact load is applied to the spindle motor, a shaft member that mounts a disk thereon hits against a lid member that closes an opening portion of a housing, and a large impact is applied to the lid member. In order to prevent the lid member from coming off from the opening portion of the housing due to the impact as described above, certain release resistance or more (strength against force to take off the lid member from the opening portion of the housing) is required for the lid member.

However, in a configuration in which the lid member is fixed to the housing as described above, in the case where the housing is formed of a resin and the lid member is formed of metal, in general, fixing force between the resin and the metal by adhesion or the like is lower as compared with that between pieces of the metal or between pieces of the resin, and accordingly, it is highly apprehended that sufficient fixing force cannot be obtained between the lid member and the housing, resulting in a shortage of the release resistance of the lid member.

Further, it is also conceived that fixing surfaces of the lid member and the housing are processed with high accuracy to enhance fitting accuracy therebetween, whereby the release resistance of the lid member is enhanced. However, such high-accuracy processing leads to a radical increase in processing cost of the lid member and the housing.

Under the circumstances as described above, it is an object of the present invention to provide a fluid dynamic bearing device capable of obtaining sufficient release resistance of the lid member without depending on a material of the housing or bringing about the radical increase of the cost.

In order to achieve the above-mentioned object, according to the present invention, a fluid dynamic bearing device includes: an outer member that is fixed to an inner peripheral surface of a bracket, and is opened on axial both sides thereof; a lid member that closes a one end-side opening portion of the outer member; a shaft member housed on an inner periphery of the outer member; and a radial bearing gap allowing an outer peripheral surface of the shaft member to face thereto, in which the lid member is fixed to the bracket. Alternatively, in the fluid dynamic bearing device, the lid member and the bracket are formed integrally with each other.

As described above, in the fluid dynamic bearing device of the present invention, the lid member is fixed to the bracket, or alternatively, the lid member and the bracket are formed integrally with each other, whereby the release resistance of the lid member is exerted by the bracket. In such a way, the fixing force required between the housing and the lid member in order to obtain the sufficient release resistance of the lid member can be alleviated. Alternatively, fixture between the housing and the lid member can be made unnecessary. Accordingly, the release resistance of the lid member can be maintained irrespective of the material of the housing. Further, a burden on the fixing force between the housing and the lid member is alleviated, whereby processing accuracy for fixing surfaces of both of the members can be relieved, and processing cost of those members can be reduced. In the fluid dynamic bearing device as described above, if the lid member is further fixed to the outer member, the release resistance of the lid member can be further enhanced.

Further, if the lid member includes: a plate portion that covers the opening portion of the outer member; and a fixing portion extended axially from a radially outer end of the plate portion and an outer peripheral surface of the fixing portion is fixed to the bracket, an area of a fixed surface between the lid member and the outer member can be ensured even in the case of attempting weight reduction of the device by thinning the plate portion. In other words, the weight reduction of the bearing device and the enhancement of the release resistance of the lid member can be attained simultaneously.

A motor, which includes: the fluid dynamic bearing device as described above; a stator coil fixed to an outer peripheral surface of the bracket; and a rotor magnet that rotates relatively to the stator coil by electromagnetic force of the stator coil, is excellent in release resistance of the lid member. Accordingly, the motor can be suitably used for purposes, in which shaft member-side weight is large, such as a spindle motor for an HDD that mounts a plurality of disks thereon.

As described above, according to the fluid dynamic bearing device of the present invention, it is possible to obtain sufficient release resistance of the lid member without depending on a material of the housing or bringing about the radical increase of the cost.

DETAILED DESCRIPTION OF THE INVENTION

A section of a fluid dynamic bearing device according to a fourth embodiment of the present invention.

Figure 1:
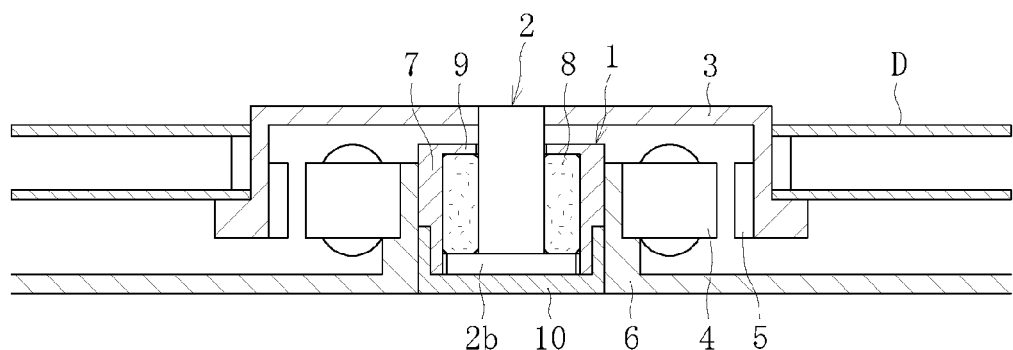
FIG. 1 is a sectional view of a spindle motor into which a fluid dynamic bearing device is incorporated.

FIG. 1 illustrates an example of the structure of a spindle motor for an information apparatus incorporating a fluid dynamic bearing device 1 according to a first embodiment of the present invention. This spindle motor is used in a disk drive such as an HDD, and includes a fluid dynamic bearing device 1 for rotatably supporting a shaft member 2 in a non-contact manner, a disk hub 3 attached to a shaft member 2, a bracket 6 attached to an outer periphery of the fluid dynamic bearing device 1, and a stator coil 4 and a rotor magnet 5 that are opposed to each other with, for example, a radial gap therebetween. The stator coil 4 is mounted to a mounting portion provided to an outer peripheral surface of the bracket 6, and the rotor magnet 5 is mounted to an inner periphery of the disk hub 3. The disk hub 3 holds multiple (two in FIG. 1) disks D such as magnetic disks. When the stator coil 4 is energized, the rotor magnet 5 relatively rotates due to an electromagnetic force generated between the stator coil 4 and the rotor magnet 5, and thus, the disk hub 3 rotates integrally with the shaft member 2.

Figure 2:
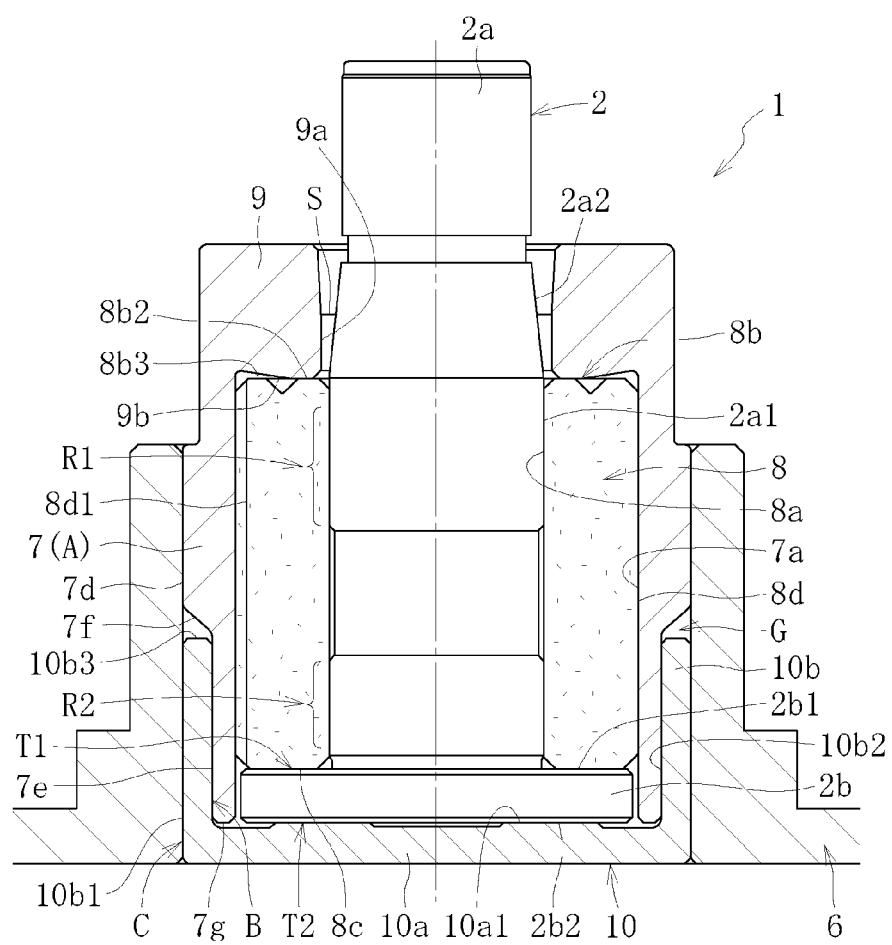
FIG. 2 is a sectional view of the fluid dynamic bearing device.

FIG. 2 illustrates the fluid dynamic bearing device 1. This fluid dynamic bearing device 1 is formed of: a housing 7 as an outer member A in which axial both ends are opened; a lid member 10 that closes a one-end opening portion of the housing 7; a bearing sleeve 8 fixed to an inner peripheral surface 7a of the housing 7; and the shaft member 2 inserted into an inner periphery of the housing 7. Note that, for the sake of convenience of description, the description is made on the premise that an opening side of the housing 7 is referred to as an upper side, and a side on which the housing 7 is closed by the lid member 10 is referred to as a lower side.

The shaft member 2 is formed of a metal material such as stainless steel, and is provided with the shaft portion 2a and the flange portion 2b provided integrally or separately at the lower end of the shaft portion 2a. Apart from forming the entire shaft member 2 of a metal material, it is also possible to form all or a part (both end surfaces, for example) of the flange portion 2b by a resin, thereby realizing a hybrid structure formed of a metal and a resin.

The bearing sleeve 8 is formed, for example, of a porous body made of sintered metal, in particular, a porous body made of sintered metal including copper as a main component, and is formed into a cylindrical shape. The bearing sleeve 8 is fixed to a predetermined position on the inner peripheral surface 7a of the housing 7 through press-fitting, bonding, or press-fitting through intermediation of an adhesive.

Figure 3A:
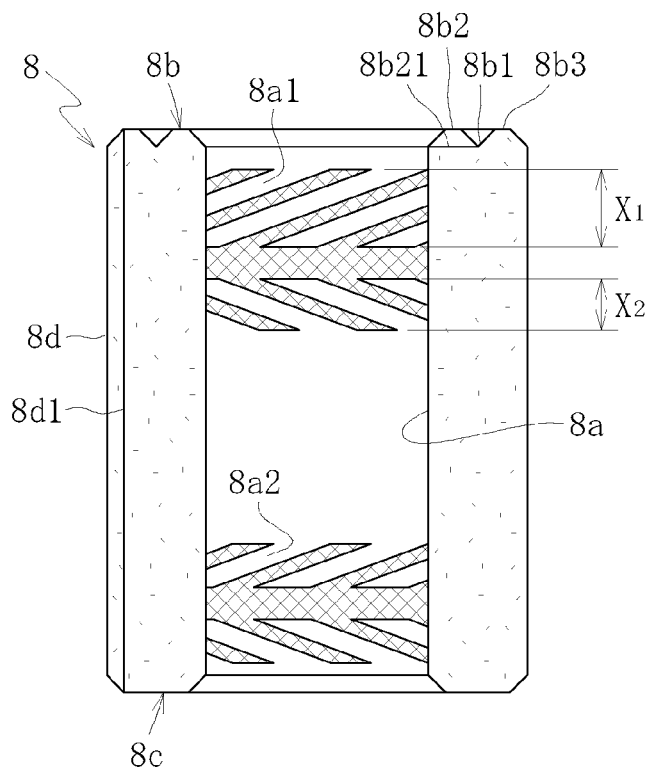
FIG. 3a is a sectional view of a bearing sleeve (along the a-a direction of (FIG. 3c))

On two regions on an inner peripheral surface 8a of the bearing sleeve 8, which are spaced apart from each other in an axial direction, dynamic pressure grooves 8a1 and 82a having a herringbone shape, for example, as illustrated in FIG. 3(a) are formed. Regions illustrated by cross hatching of FIG. 3(a) represent hill portions protruding from a circumferential region toward a radially inner side, and among the hill portions, between portions extended obliquely from annular smooth portions thereof to axial both sides thereof in a circumferential direction, the dynamic pressure grooves 8a1 and 8a2 are provided. The upper-side dynamic pressure groove 8a1 is formed axially asymmetrically with respect to the annular smooth portion provided in a substantially axial center portion of the upper-side hill portion, in which an axial dimension X1 of an upper-side region from the annular smooth portion is larger than an axial dimension X2 of a lower-side region therefrom. The lower-side dynamic pressure groove 8a2 is formed axially symmetrically. A region located axially between regions where the dynamic pressure grooves 8a1 and 8a2 vertically spaced apart from each other are formed is formed to have the same diameter as that of the dynamic grooves 8a1 and 8a2, and is continuous with the dynamic pressure grooves 8a1 and 8a2.

Figure 3B:
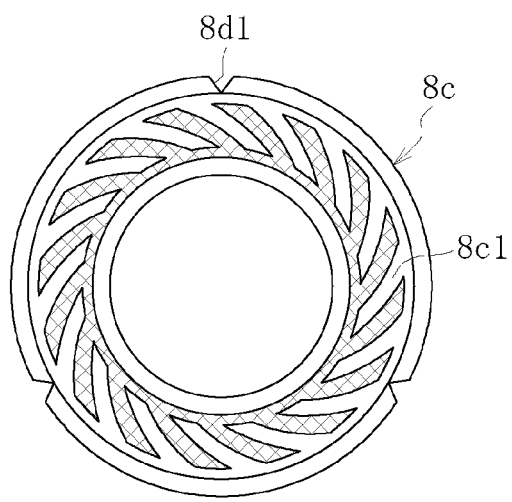
FIG. 3b is a bottom view of the bearing sleeve.

On a lower-side end surface 8c of the bearing sleeve 8, a dynamic pressure groove 8c1 having a spiral shape, for example, as illustrated in FIG. 3(b) is formed. Further, in an outer peripheral surface 8d of the bearing sleeve 8, an arbitrary number of axial grooves 8d1 are formed across an axial entire length of the bearing sleeve 8. In the illustrated example, three axial grooves 8d1 are formed at equiangular intervals.

Figure 3C:
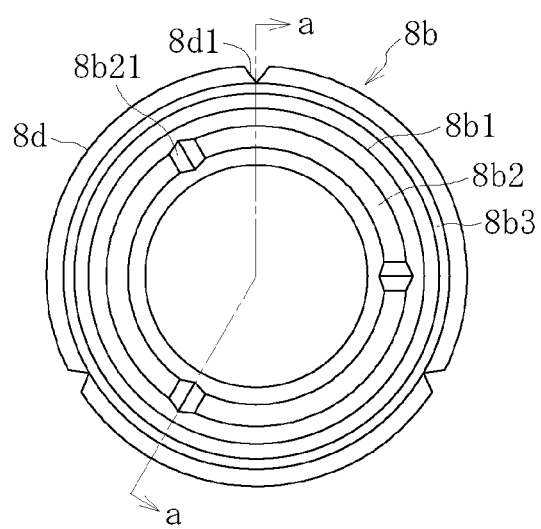
FIG. 3c is a top view of the bearing sleeve.

As illustrated in FIG. 3(c), an upper-side end surface 8b of the bearing sleeve 8 is partitioned into a radially inner-side region 8b2 and a radially outer-side region 8b3 by a circumferential groove 8b1 provided in a substantially radial center portion of the upper-side end surface 8b. In the radially inner-side region 8b2, one or plural radial grooves 8b21 is (are) formed. In the illustrated example, three radial grooves 8d1 are formed at equiangular intervals.

The housing 7 is formed into a substantially cylindrical shape, and a seal portion 9 that seals an upper-end opening portion of the housing 7 is provided integrally therewith. In an outer peripheral surface of the housing 7, there are provided: a larger-diameter outer peripheral surface 7d; a smaller-diameter outer peripheral surface 7e provided in a lower-end opening portion thereof; and a step portion 7f formed between the larger-diameter outer peripheral surface 7d and the smaller-diameter outer peripheral surface 7e. The step portion 7f is formed into a taper shape gradually reduced downward in diameter. An axial position of an upper end portion of the smaller-diameter outer peripheral surface 7e reaches an upper portion beyond a lower-side radial bearing portion R2. The lid member 10 is fixed to the smaller-diameter outer peripheral surface 7e of the housing 7, and the bearing sleeve 8 is fixed to the inner peripheral surface 7a thereof. Note that the seal portion 9 can also be formed as a separate body from the housing 7.

The housing 7 and the seal portion 9 are formed by, for example, injection molding of a crystalline resin such as liquid crystal polymer (LCP), polyphenylene sulfide (PPS), and polyetherether ketone (PEEK), or of a resin composition with a base resin formed of an amorphous resin such as polyphenyl sulfone (PPSU), polyether sulfone (PES), and polyether imide (PEI). The type of filler to be filled to the resin described above is not limited in particular, and therefore, for example, fiber filler such as glass fiber, whisker filler such as potassium titanate, scale-like filler such as mica, fiber or powder conductive filler such as carbon fiber, carbon black, black lead, carbon nano material, and metal powder can be used as fillers. Such fillers can be used alone or can be used by mixing two or more types.

Figure 4:
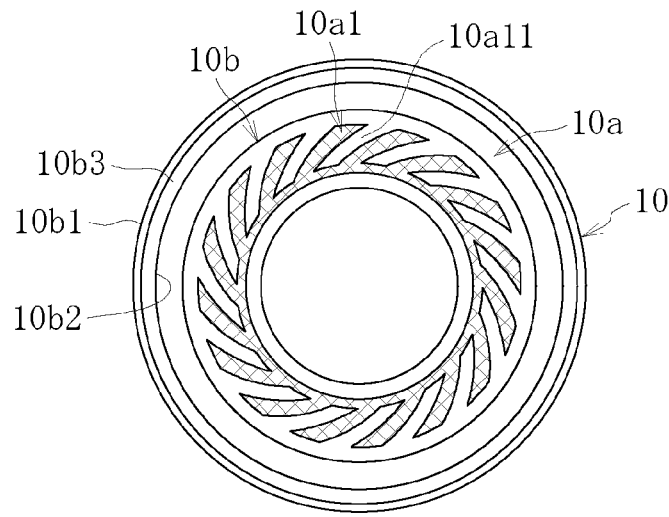
FIG. 4 is a top view of a lid member.

The lid member 10 includes: a plate portion 10a that forms a substantially disc shape, and covers the lower-end opening portion of the housing 7; and a cylindrical fixing portion 10b extended axially from a radially outer end of the plate portion 10a. The plate portion 10a and the fixing portion 10b are formed integrally with each other through pressing a metal material such as brass. In an upper-side end surface 10a1 of the plate portion 10, a spiral-shaped dynamic pressure groove 10a11, for example, as illustrated in FIG. 4 is formed. Between an end surface 10b3 of the fixing portion 10b of the lid member 10 and the step portion 7f of the housing 7, a wedge-like space G having an axial dimension gradually expanded radially outward is provided. The space G opens to the outer periphery of the housing 7. An axial position of an upper end portion of the fixing portion 10b reaches an upper portion beyond the lower-side radial bearing portion R2. Between an upper-side end surface 10a1 of the plate portion 10a and a lower end portion 7g of the housing 7, axial gaps which serve as adjustment margins for setting thrust bearing gaps are formed.

An inner peripheral surface 10b2 of the fixing portion 10b of the lid member 10 is fitted to the smaller-diameter outer peripheral surface 7e of the housing 7 in a loose-fitting manner, and is fixed thereto by adhesion or the like (such a fixed portion is referred to as an inner fixed portion B). Further, an outer peripheral surface 10b1 of the fixing portion 10b of the lid member 10 is fixed to an inner peripheral surface of the bracket 6, for example, by adhesion or the like (such a fixed portion is referred to as an outer fixed portion C).

As described above, the lid member 10 is fixed to the bracket 6, whereby the release resistance of the lid member 10 can be exerted by not only the inner fixed portion B between the lid member 10 and the housing 7 but also the outer fixed portion C between the lid member 10 and the bracket 6. Accordingly, fixing force required for the inner fixed portion B can be reduced. In such a way, options to select a fixing method of the inner fixed portion B are widened, and besides the adhesion, for example, fixation by screwing, caulking, welding, or the like becomes possible. Further, due to the fact that the fixing force required for the inner fixed portion B is reduced, processing accuracy for a fixing surface of the inner fixed portion B, that is, for the inner peripheral surface 10b2 of the fixing portion 10b of the lid member 10 and the smaller-diameter outer peripheral surface 7e of the housing 7 can be decreased, and accordingly, processing cost of the lid member 10 and the housing 7 can be reduced. Note that, in the case where the release resistance of the lid member 10 is sufficiently obtained only by the outer fixed portion C, the inner fixed portion B can be omitted. Further, the fixing method in the outer fixed portion C is not limited to the above-mentioned method, and means such as press-fitting, press-fitting and adhesion, or welding can be adopted.

Further, due to the fact that the fixing portion 10b extended upward from the plate portion 10a is provided in the lid member 10, and that the outer peripheral surface 10b1 of this fixing portion 10b is fixed to the bracket 6, an axial dimension of a fixed surface (outer fixed portion C) between the lid member 10 and the bracket 6 can be set to be larger than a thickness of the plate portion 10a. In such a way, the fixing force between the lid member 10 and the bracket 6 is enhanced, and a further enhancement of the release resistance of the lid member 10 can be achieved. Further, due to the fact that the fixing surface of the lid member 10 to the bracket 6 is provided on the fixing portion 10b, the fixing force between the lid member 10 and the bracket 6 can be maintained (or increased) even in the case of thinning the plate portion 10a. Due to the fact that the plate portion 10a is thinned as described above, thinning of the fluid dynamic bearing device 1 is achieved, or alternatively, an axial dimension of the bearing sleeve 8 can be increased by the amount of thinning the lid member 10 without increasing an axial dimension of the fluid dynamic bearing device 1. Accordingly, an axial interval between the radial bearing portions R1 and R2 is increased whereby bearing rigidity in the radial direction can be enhanced.

Further, due to the fact that the wedge-like space G is provided between the upper end surface 10b3 of the fixing portion 10b of the lid member 10 and the step portion 7f of the housing 7, adhesive of the inner fixed portion B can be drawn into the inner fixed portion B side by a capillary force even if the adhesive leaks to this space G. Further, a capacity of the space G can be ensured to be large through expanding the axial interval toward the radially outer side, and accordingly, the space G functions as an adhesive pocket between the bracket 6 and the fluid dynamic bearing device 1, and the fixing force therebetween can be enhanced. Note that such an effect can also be obtained in such a manner that the step portion 7f of the housing 7 is formed to be flat, and that the upper end portion of the fixing portion 10b of the lid member 10 is formed into a taper shape gradually expanded downward in diameter.

Incidentally, for example, in the case of arranging the upper end portion of the inner fixed portion B within an axial range of the lower-side radial bearing portion R2, then among the housing 7, a portion (smaller-diameter outer peripheral surface 7e) adhered and fixed to the lid member 10 and a portion (step portion 7f) facing to the wedge-like space G are arranged in the outer peripheral surface of the radial bearing portion R2, and further, a portion (larger-diameter outer peripheral surface 7d) adhered and fixed to the bracket 6 is sometimes arranged therein. Those respective portions differ from one another in radial thickness, amount of the adhesive applied thereon, tightening force received from counterpart members to which those portions are adhered, or the like. Accordingly, it is apprehended that a difference in diameter reduction amount of the housing 7 may occur. If the difference in reduction amount of the housing 7 influences the inner peripheral surface 8a of the bearing sleeve 8, width accuracy of the bearing gap of the radial bearing portion R2 is deteriorated to lower bearing performance. In contrast, in this embodiment, the axial position of the upper end portion of the inner fixed portion B reaches the upper portion beyond the lower-side radial bearing portion R2, and accordingly, the smaller-diameter outer peripheral surface 7e of the housing 7 is arranged over the axial region of the radial bearing portion R2, and this surface is adhered and fixed to the lid member 10. In such a way, in the axial region of the radial bearing portion R2, the radial thickness of the housing 7 and the amount of the adhesive applied thereof are uniformed, and in addition, the housing 7 in this region is adhered and fixed to the inner peripheral surface 10b2 of the lid member 10 having the cylindrical surface shape. Accordingly, in this region, the housing 7 can be uniformly contracted, and the lowering of the bearing performance of the radial bearing portion R2 can be avoided. Note that such an effect can also be obtained through arranging the upper end portion of the inner fixed portion B blow the lower-side radial bearing portion R2.

An inner peripheral surface 9a of the seal portion 9 is opposed to a taper surface 2a2, which is provided in an outer periphery of a shaft portion 2a through a predetermined seal space S, and forms a capillary seal that holds lubricant oil by the capillary force. Note that, if the taper surface 2a2 of the shaft portion 2a is gradually reduced upward in diameter in advance as illustrated, the seal space S can be allowed to also function as a centrifugal force seal when the shaft member 2 rotates. A capacity of the seal space S is set to be larger than a thermal expansion amount of the lubricant oil held in an inside of the bearing device within a temperature range in which the bearing device is to be used. In such a way, within the temperature range in which the bearing device is to be used, the lubricant oil does not leak out of the seal space S, and an oil surface of the lubricant oil is always held in the seal space S (buffer function).

When the shaft member 2 rotates, the radial bearing gaps are formed between the inner peripheral surface 8a of the bearing sleeve 8 and the outer peripheral surface 2a1 of the shaft member 2, and in addition, the thrust bearing gaps are individually formed between the lower-side end surface 8c of the bearing sleeve 8 and the upper-side end surface 2b1 of the flange portion 2b of the shaft member 2, and between the lower-side end surface 8c of the bearing sleeve 8 and the upper-side end surface 10a1 of the plate portion 10a of the lid member 10. Then, the dynamic pressure grooves 8a1 and 8a2 of the inner peripheral surface 8a of the bearing sleeve 8 allow the lubricant oil in the above-mentioned radial bearing gaps to generate a dynamic pressure action, whereby the radial bearing portions R1 and R2, which rotatably support the shaft portion 2a of the shaft member 2 in the radial direction in a non-contact manner, are configured. At the same time, the dynamic pressure groove 8c1 of the lower-side end surface 8c of the bearing sleeve 8 and the dynamic pressure groove 10a11 of the upper-side end surface 10a1 of the plate portion 10a of the lid member 10 allow the lubricant oil in the above-mentioned respective thrust bearing gaps to generate the dynamic pressure groove, whereby a first thrust bearing portion T1 and a second thrust bearing portion T2, which rotatably support the flange portion 2b of the shaft member 2 in both thrust directions in the non-contact manner, are configured. At this time, a lower end of the radial bearing gap communicates with a radially outer end of the bearing gap of the first thrust bearing portion T1.

Further, as described above, the dynamic pressure generating grooves 8a1 of the inner peripheral surface 8a of the bearing sleeve 8 are formed asymmetrically in the axial direction with respect to an annular smooth portion of the substantially axial center portion, and the axial dimension X1 of the upper region with respect to the annular smooth portion is larger than the axial dimension X2 of the lower region (refer to FIG. 3(*a*)). Thus, during rotation of the shaft member 2, a drawing-in force (pumping force) to the lubricant oil due to the dynamic pressure grooves 8a1 is relatively large in the upper region as compared with the lower region. Further, due to this pressure difference in a drawing-in force, the lubricant oil in the radial bearing gap flows downwards, and circulates through the route: the thrust bearing gaps of the first thrust bearing portion T1→the axial grooves 8d1→a space between the lower end surface 9b of the seal portion 9 and the upper end surface 8b of the bearing sleeve 8 before being drawn into the radial bearing gap again. In this way, the lubricant oil flows and circulates through the inner spaces of the housing 7, whereby phenomenon in which pressure of the lubricant oil in the inner space locally becomes negative pressure is prevented, making it possible to solve the problems such as generation of bubbles due to generation of negative pressure, and occurrence of lubricant oil leakage and generation of vibration due to generation of bubbles. Further, even when bubbles are allowed to be mixed into the lubricant oil for some reason or other, such bubbles are discharged into the atmosphere via the oil surface (gas/liquid interface) of the lubricant oil in the seal space S when the bubbles circulate with the lubricant oil. Accordingly, the adverse effect of the bubbles can be prevented even more effectively.

Assembly of the fluid dynamic bearing device having the above-mentioned configuration is performed in such a manner that, after the bearing sleeve 8 is inserted into the inner periphery of the housing 7, and the housing 7 and the bearing sleeve 8 are fixed to each other by the adhesion or the like, the shaft member 2 is inserted into the inner periphery of the bearing sleeve 8, and further, the lid member 10 is fixed to the opening portion of the housing 7. In this case, the axial position of the lid member 10 with respect to the housing 7 is adjusted, whereby gap widths of the thrust bearing gaps are controlled at predetermined values. At this time, the inner peripheral surface 10b2 of the fixing portion 10 of the lid member 10 and the smaller-diameter outer peripheral surface e of the housing 7 are fitted to each other in the loose-fitting manner, whereby relative movement of the lid member 10 and the housing 7 can be performed easily. Accordingly, it becomes easy to perform a width setting operation of each of the thrust bearing gaps, and width setting thereof can be performed accurately. Thereafter, the lubricant oil is injected into the inside of the bearing device from the seal space S, and the inner space of the housing, which includes internal pores in the bearing sleeve 8, is entirely filled with the lubricant oil, whereby the fluid dynamic bearing device 1 is completed. The larger-diameter outer peripheral surface 7d of the housing 7 of the fluid dynamic bearing device 1 and the outer peripheral surface 10b1 of the lid member 10 thereof are fixed to the inner peripheral surface of the bracket 6, whereby the fluid dynamic bearing device 1 is incorporated into the motor.

The present invention is not limited to the above embodiments. Note that, in the following description, the parts having the same function as those in the above embodiments are denoted by the same reference symbols, and the description thereof is omitted.

Figure 5:
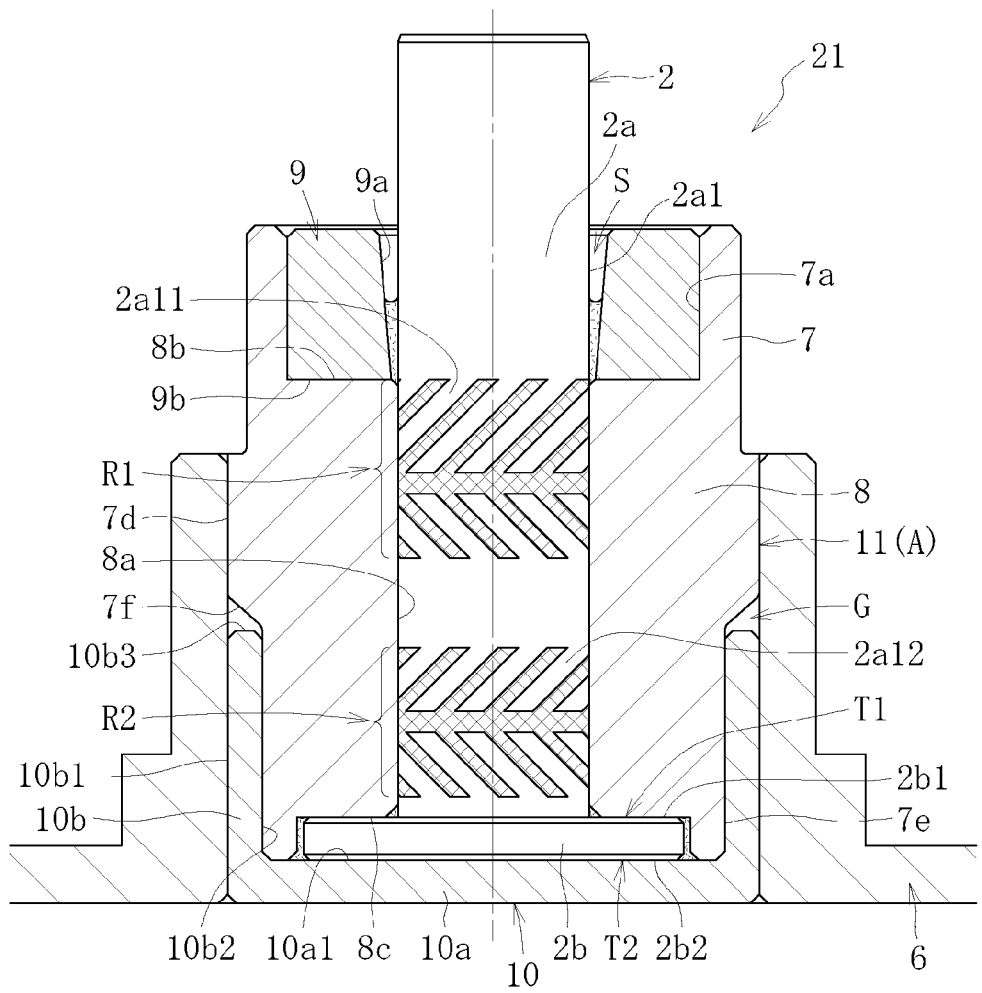
FIG. 5 is a sectional view of a fluid dynamic bearing device according to a second embodiment of the present invention.

FIG. 5 illustrates a fluid dynamic bearing device 21 according to a second embodiment of the present invention. In this fluid dynamic bearing device 21, the housing 7 and the bearing sleeve 8 are formed, as a bearing member 11, of a resin material integrally with each other, and this bearing member 11 serves as an outer member A. The seal portion 9 is formed as a separate body from the housing 7 and is fixed to an upper end opening portion of the bearing member 11, and a lower-side end surface 9b thereof hits against the upper-side end surface 8b of the bearing sleeve 8. The inner peripheral surface 9a of the seal portion 9 has a taper surface gradually expanded upward in diameter, and the seal space S is formed between this inner peripheral surface 9a and the cylindrical outer peripheral surface 2a1 of the shaft portion 2a. On the outer peripheral surface 2a of the shat portion 2a, dynamic pressure grooves 2a11 and 2a12 having a herringbone shape are formed at two spots spaced apart from each other in the axial direction, and at the time when the shaft member 2 rotates, such regions where the dynamic pressure grooves are formed allow the lubricant oil in the radial bearing gaps R1 and R2 to generate the dynamic pressure action. The lid member 10 is fixed to the smaller-diameter outer peripheral surface 7e provided on a lower end of the bearing member 11. In the case where the bearing member 11 is formed of the resin as described above, it is apprehended that adhering and fixing force between the bearing member 11 and the metal-made bracket 6 cannot be sufficiently obtained. However, the outer peripheral surface 10b1 of the metal-made lid member 10 and the bracket 6 are fixed to each other as in the illustrated example, whereby the bracket 6 and the fluid dynamic bearing device 1 can be strongly fixed to each other.

Figure 6:
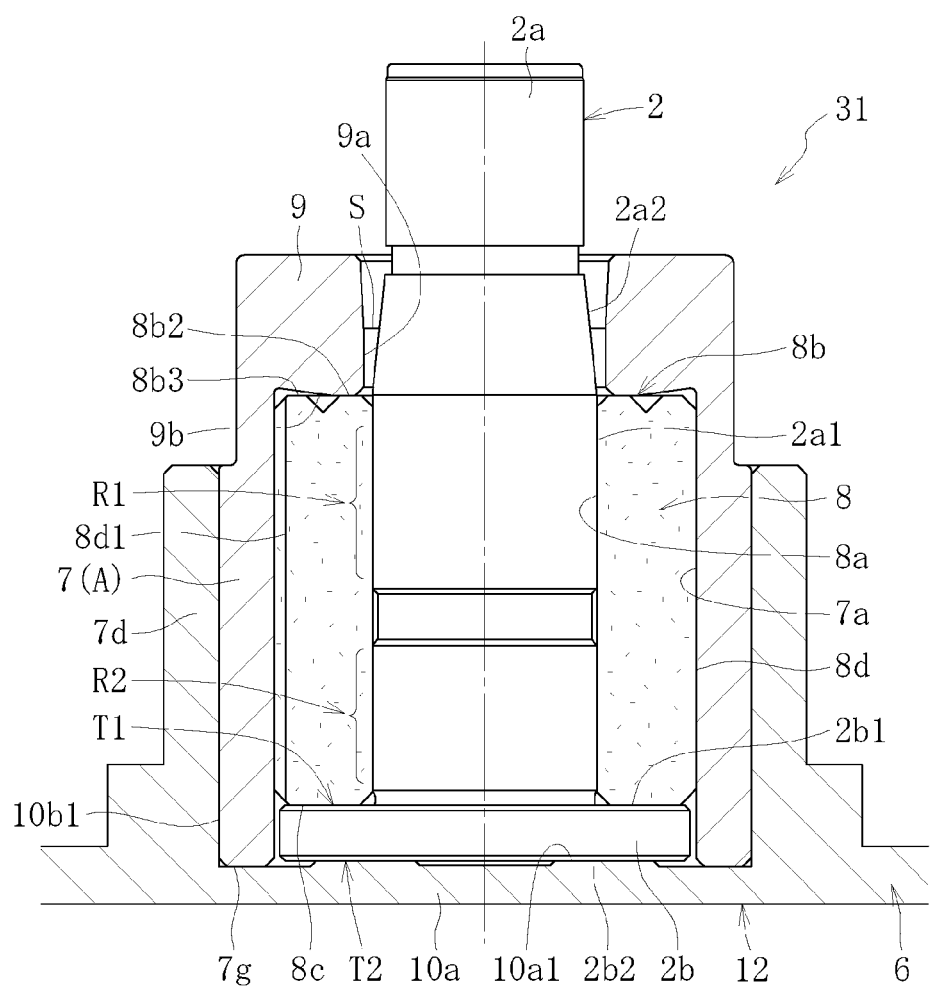
FIG. 6 is a sectional view of a fluid dynamic bearing device according to a third embodiment of the present invention.

FIG. 6 illustrates a fluid dynamic bearing device 31 according to a third embodiment of the present invention. This fluid dynamic bearing device 31 is different from those of the above-mentioned embodiments in that the lid member 10 and the bracket 6 are formed integrally with each other. An integrally formed article 12 of the lid member 10 and the bracket 6 integrally includes a portion corresponding to the plate portion 10a of the lid member 10, and a portion corresponding to the bracket 6, and for example, is formed by performing injection molding for a resin material. An inner peripheral surface of the portion corresponding to the bracket 6 in this integrally formed article 12 is fixed to the outer peripheral surface 7d of the housing 7 by the adhesion or the like. As described above, the lid member 10 and the bracket 6 are formed integrally with each other, whereby the release resistance of the lid member 10 can be further enhanced. Assembly of this fluid dynamic bearing device 31 is performed in such a manner that the above-mentioned integrally formed article 12 is fixed to the outer peripheral surface 7d of the housing 7 in a state where the bearing sleeve 8 and the shaft member 2 are housed on the inner periphery of the housing 7.

Figure 7:
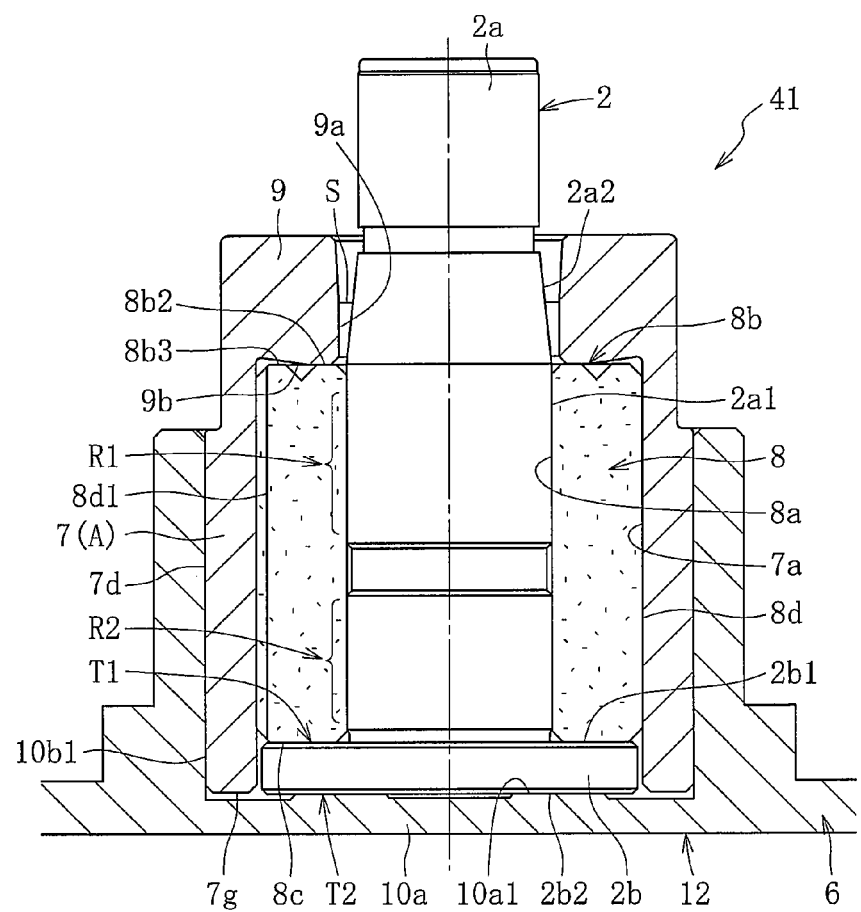
FIG. 7 is a section of a fluid dynamic bearing device according to a fourth embodiment of the present invention.

Note that, in each of the fluid dynamic bearing devices 21 and 31 according to the above-mentioned second and third embodiments, the lower end surface 7g of the housing 7 is hit against the upper-side end surface 10a1 of the portion corresponding to the plate portion 10a, whereby the width setting of the thrust bearing gaps of the thrust bearing portions T1 and T2 is performed. Also in those fluid dynamic bearing devices 21 (FIG. 5) and 31 (FIG. 6), in a similar way to the fluid dynamic bearing device 1 (FIG. 2) according to the above-mentioned first embodiment, the axial gaps which serve as the adjustment margins for performing the width setting of the thrust bearing gaps may be provided between the lower end surface 7g of the housing 7 and the upper-side end surface 10a1 of the plate portion 10a. For example, this embodiment is illustrated in FIG. 7, which has exactly the same structure as FIG. 6, except for the thrust bearing gaps provided between the lower end surface 7g of the housing 7 and the upper side end surface 10a1 of the plate portion 10a, of FIG. 1, as described above.

Further, in each of the above-mentioned first embodiment and second embodiment, the fluid dynamic bearing device is fixed to the inner periphery of the bracket 6 after being assembled. However, the present invention is not limited to this. For example, after the bracket 6 and the housing 7 are fixed to each other, the fixing of the lid member 10 and the lubrication may be performed. Alternatively, after the bracket 6 and the lid member 10 are fixed to each other, the fixing of the housing 7 and the lubrication may be performed.

In each of the above-mentioned embodiments, the housing 7 is formed of the resin. However, the present invention is not limited to this, and for example, the housing 7 may be formed of a metal material. Further, in the above description, the lid member 10 and the bracket 6 are formed of the metal material. However, the lid member 10 and the bracket 6 may be formed of a resin material. In the above description, the bearing sleeve 8 is formed of the sintered metal. However, the bearing sleeve 8 may be formed of other metal materials and resin materials.

Further, in each of the above-mentioned embodiments, as the dynamic pressure generating portions (radial dynamic pressure generating portions) which allow the lubricant oil of the radial bearing portions R1 and R2 to generate the dynamic pressure action, the dynamic pressure grooves 8a1 and 8a2 having the herringbone shape are formed, and as the dynamic pressure generating portions (thrust dynamic pressure generating portions) which allow the lubricant oil of the thrust bearing portions T1 and T2 to generate the dynamic pressure action, the dynamic pressure grooves 8c1 and 10a11 having the spiral shape are formed. However, the present invention is not limited to this. For example, it is possible to form, as the radial dynamic pressure generating portions, dynamic pressure grooves of a spiral shape, step bearings, or multi-arc bearings. Further, it is also possible to form, as the thrust bearing generating portions, dynamic pressure grooves of a herringbone shape, step bearings, or corrugated bearings (corrugated step bearings).

Further, the radial dynamic pressure generating portions may be provided on any one of the inner peripheral surface 8a of the bearing sleeve 8 and the outer peripheral surface 2a1 of the shaft portion 2a. Further, the thrust dynamic pressure generating portion of the first thrust bearing portion T1 may be provided on any one of the lower-side end surface 8c of the bearing sleeve 8 and the upper-side end surface 2b1 of the flange portion 2b, and the thrust dynamic pressure generating portion of the second thrust bearing portion T2 may be provided on any one of the end surface 10a1 of the lid member 10 and the lower-side end surface 2b2 of the flange portion 2b.

Further, in each of the above-mentioned embodiments, the shaft member 2 includes the flange portion 2b. However, a cylindrical shaft member that does not have the flange portion can also be used. For example, a configuration can be adopted, in which the shaft member 2 has a lower end surface, and the thrust bearing portion is formed by a dynamic pressure groove of the lubricant oil in a thrust bearing gap formed between the lower end surface and the end surface 10a1 of the lid member 10. Alternatively, a configuration can be adopted, in which a shaft member 2 having a spherical protruding portion on a lower end thereof is used, and a so-called pivot bearing is formed of this spherical protruding portion and the lid member. At this time, one end of the radial bearing gap communicates with a space hermetically sealed by the lid member 10, that is, a space formed between the lid member 10 and the thrust bearing gap or the spherical protruding portion.

Further, in each of the above-mentioned embodiments, while the radial bearing portions R1 and R2 are provided separately from each other in the axial direction, the radial bearing portions R1 and R2 may be continuously provided in the axial direction. Alternatively, only any one of the radial bearing portions R1 and R2 may be provided.

Further, both of the inner peripheral surface 8a of the bearing sleeve 8 and the outer peripheral surface of the shaft portion 2a are formed into a full circular shape, whereby the radial bearing portions can also be formed of so-called full circular bearings.

Further, in each of the above-mentioned embodiments, as the lubricant fluid filling inside the bearing device, a lubricant oil is used. However, the lubricant fluid is not limited thereto and, for example, lubricant grease, magnetic fluid, and gas such as the air may be used.

Further, the fluid dynamic bearing device of the present invention is not restricted to a spindle motor as described above to be used in a disk drive such as an HDD. The fluid dynamic bearing device of the present invention is also suitably used in a small motor for an information apparatus used under high speed rotating condition, such as a spindle motor for driving an optical disk or a magneto-optical disk or a polygon scanner motor in a laser beam printer, or a fan motor for a cooling fan of an electrical apparatus.

The invention claimed is:
1. A fluid dynamic bearing device, comprising:
a housing which is open in both axial ends thereof;

an integrally formed article formed integrally by injection molding by resin, the integrally formed article comprising:
a bracket having a mounting portion for a stator coil; and
a lid member that closes one end-side opening portion of the housing;
a shaft member having a shaft portion and a flange portion, the shaft member being housed in an inner periphery of the housing; and
a radial bearing gap formed in between the shaft member and the housing, and
thrust bearing gaps which are individually formed in between one end surface of the flange portion and a surface facing to the one end surface of the flange portion in an axial direction, and between another end surface of the flange portion and an end surface of the lid member,
wherein the housing is fixed to an inner peripheral surface of the integrally formed article such that the housing does not abut the integrally formed article in the axial direction.

2. A motor, comprising:
the fluid dynamic bearing device according to claim 1;
the stator coil fixed to an outer peripheral surface of the bracket; and
a rotor magnet that rotates relatively to the stator coil by electromagnetic force of the stator coil.

3. A fluid dynamic bearing device, comprising:
a housing fixed to an inner peripheral surface of a bracket, and which is open on both axial sides thereof;
a bearing sleeve fixed to an inner peripheral surface of the housing;
a shaft member having a shaft portion and a flange portion, the shaft portion inserted into the bearing sleeve;
a lid member comprising a plate portion covering one end-side opening portion of the housing, and a fixing portion extending axially from a radially outer end of the plate portion, the plate portion and the fixing portion are formed integrally with one another;
a radial bearing gap formed in between an outer peripheral surface of the shaft member and an inner peripheral surface of the bearing sleeve;
thrust bearing gaps which are individually formed in between an end surface of the bearing sleeve and one end surface of the flange portion, and between another end surface of the flange portion and an end surface of the plate portion of the lid member,
wherein an outer peripheral surface of the fixing portion of the lid member is fixed to the bracket by adhesion, and an inner peripheral surface of the fixing portion is fitted to an outer peripheral surface of an axial end of the housing,
wherein a thickness of the plate portion is smaller than an axial dimension of the fixing portion, and
wherein an axial end of the housing overlaps with an axial region of the flange portion of the shaft member.

4. The fluid dynamic bearing device according to claim 3, wherein the housing is made of resin, and
wherein the lid member and the bracket are made of metal.

5. A fluid dynamic bearing device, comprising:
a housing which is open on both axial sides thereof;
a bearing sleeve fixed to an inner peripheral surface of the housing;
a shaft member having a shaft portion and a flange portion, the shaft portion inserted into the bearing sleeve;
an integrally formed article formed integrally by injection molding by resin comprising:
a bracket having a mounting portion for a stator coil; and
a lid member that closes one end-side opening portion of the housing;
a radial bearing gap formed in between an outer peripheral surface of the shaft member and an inner peripheral surface of the bearing sleeve; and
thrust bearing gaps which are individually formed in between an end surface of the bearing sleeve and one end surface of the flange portion, and between another end surface of the flange portion and an end surface of the lid member,
wherein an outer member is fixed to an inner peripheral surface of the integrally formed article such that the outer member does not abut the integrally formed article in an axial direction.

* * * * *